US012580978B2

(12) United States Patent
Asati et al.

(10) Patent No.: US 12,580,978 B2
(45) Date of Patent: Mar. 17, 2026

(54) APPLICATION—CENTRIC WEB PROTOCOL-BASED DATA STORAGE

(71) Applicant: Cisco Technology, Inc., San Jose, CA (US)

(72) Inventors: Rajiv Asati, Morrisville, NC (US); Edward Albert Warnicke, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 76 days.

(21) Appl. No.: 18/298,838

(22) Filed: Apr. 11, 2023

(65) Prior Publication Data

US 2024/0348676 A1     Oct. 17, 2024

(51) Int. Cl.
| | |
|---|---|
| *H04L 67/02* | (2022.01) |
| *G06F 3/06* | (2006.01) |
| *H04L 67/568* | (2022.01) |

(52) U.S. Cl.
CPC ............ *H04L 67/02* (2013.01); *G06F 3/0604* (2013.01); *G06F 3/0655* (2013.01); *G06F 3/0679* (2013.01); *H04L 67/568* (2022.05)

(58) Field of Classification Search
CPC ....... H04L 67/02; H04L 67/568; H04L 67/51; H04L 41/5054; G06F 3/0604; G06F 3/0655; G06F 3/0679
See application file for complete search history.

(56) References Cited

U.S. PATENT DOCUMENTS

| | | | | |
|---|---|---|---|---|
| 9,547,598 | B1 * | 1/2017 | Karnowski | ........... G06F 3/0608 |
| 10,042,768 | B1 * | 8/2018 | Karnowski | ........... H04L 67/568 |
| 11,252,110 | B1 * | 2/2022 | Malin | ................. H04L 49/9057 |
| 11,294,602 | B2 * | 4/2022 | Noy | ..................... G06F 12/0246 |
| 2003/0061462 | A1 * | 3/2003 | Fister | .................... G06F 13/387 |
| | | | | 711/147 |
| 2007/0115939 | A1 * | 5/2007 | Lee | .......................... H04L 45/06 |
| | | | | 370/352 |
| 2008/0310420 | A1 | 12/2008 | Aloni et al. | |
| 2009/0282419 | A1 * | 11/2009 | Mejdrich | ................ H04L 47/10 |
| | | | | 719/314 |
| 2010/0100934 | A1 * | 4/2010 | Mejdrich | ................ G06F 21/74 |
| | | | | 726/3 |
| 2010/0161870 | A1 * | 6/2010 | Daniel | .................... H04L 69/16 |
| | | | | 710/314 |
| 2010/0223505 | A1 * | 9/2010 | Andreev | ............. G06F 12/1027 |
| | | | | 714/E11.178 |

(Continued)

OTHER PUBLICATIONS

Bishop, M.; Hypertext Transfer Protocol Version 3 (HTTP/3); Feb. 2, 2021; IETF; pp. 1-52. (Year: 2021).*

(Continued)

*Primary Examiner* — Muhammad Raza
(74) *Attorney, Agent, or Firm* — Lee & Hayes, P.C.

(57) ABSTRACT

A method of managing data storage processes may include, at a processing device, computing a hypertext transmission protocol version 3 (HTTP/3) header of a first message received at a network interface controller (NIC) device into a non-volatile memory express (NVMe) message, transmitting the NVMe message to a device associated with the processing device, and with the NVMe message, transmitting data directly between a NIC and the data storage device.

20 Claims, 8 Drawing Sheets

(56)        References Cited

U.S. PATENT DOCUMENTS

| | | | |
|---|---|---|---|
| 2012/0066428 A1* | 3/2012 | Miyoshi | G06F 13/4022 |
| | | | 710/311 |
| 2015/0006622 A1 | 1/2015 | Lim et al. | |
| 2016/0092362 A1* | 3/2016 | Barron | G06F 15/167 |
| | | | 711/146 |
| 2016/0094688 A1 | 3/2016 | Frey et al. | |
| 2016/0124880 A1 | 5/2016 | Goren et al. | |
| 2019/0044994 A1 | 2/2019 | Sarangam et al. | |
| 2019/0114279 A1 | 4/2019 | Shih | |
| 2021/0243247 A1 | 8/2021 | He et al. | |
| 2022/0124182 A1 | 4/2022 | Galles et al. | |
| 2023/0010150 A1* | 1/2023 | Ben-Ishay | H04L 1/0041 |
| 2023/0385094 A1* | 11/2023 | Markuze | G06F 13/404 |
| 2023/0409243 A1* | 12/2023 | Markuze | H04L 67/1097 |
| 2024/0048543 A1* | 2/2024 | Yu | H04L 63/0485 |
| 2024/0378073 A1* | 11/2024 | Maroney | G06F 13/4221 |

OTHER PUBLICATIONS

European Search Report for European Application No. 24168573.4, dated Sep. 2, 2024, 9 Pages.

* cited by examiner

400

Figure 5:
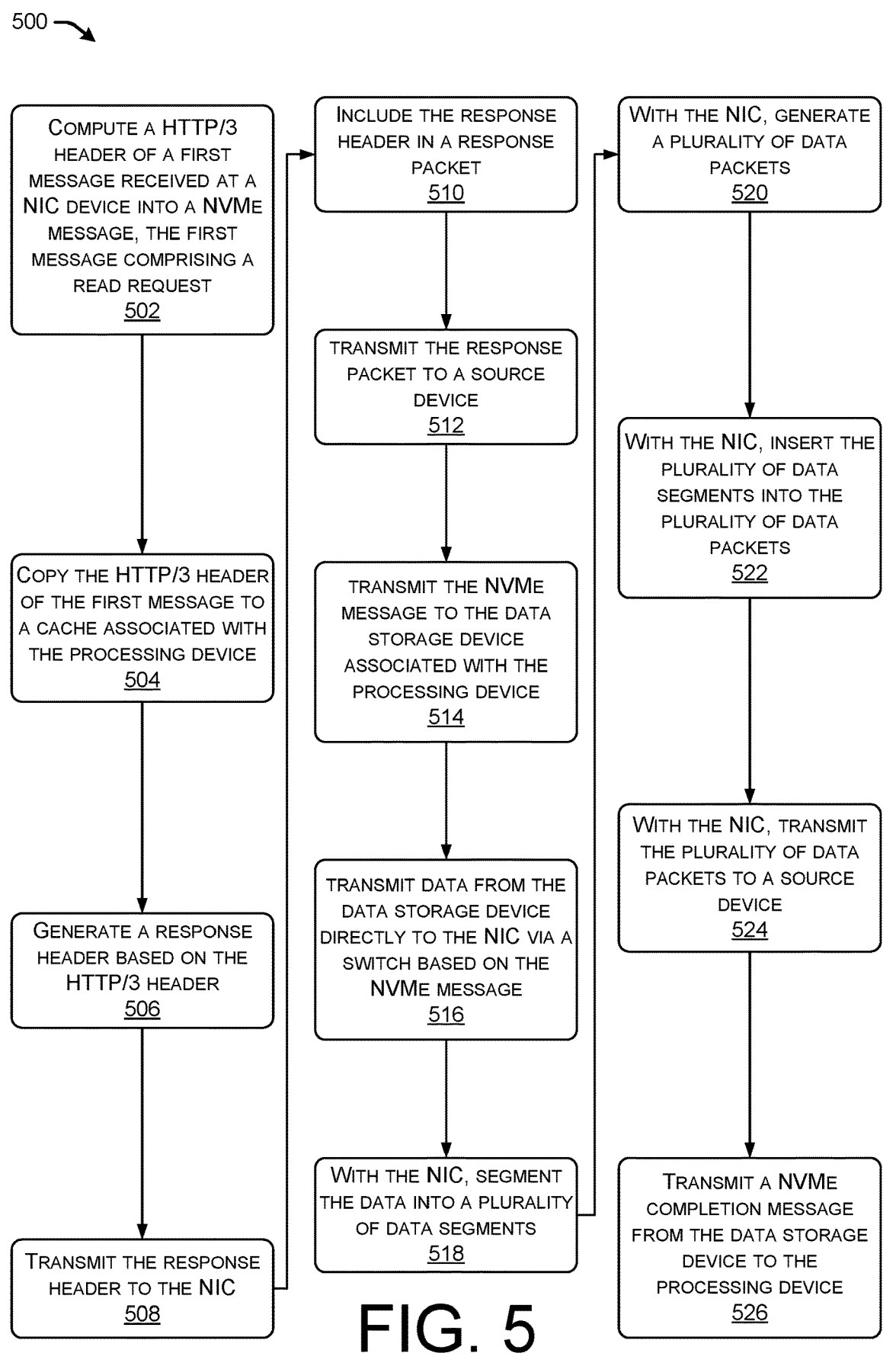

500 ⤵

COMPUTE A HTTP/3 HEADER OF A FIRST MESSAGE RECEIVED AT A NIC DEVICE INTO A NVME MESSAGE, THE FIRST MESSAGE COMPRISING A READ REQUEST
502

COPY THE HTTP/3 HEADER OF THE FIRST MESSAGE TO A CACHE ASSOCIATED WITH THE PROCESSING DEVICE
504

GENERATE A RESPONSE HEADER BASED ON THE HTTP/3 HEADER
506

TRANSMIT THE RESPONSE HEADER TO THE NIC
508

INCLUDE THE RESPONSE HEADER IN A RESPONSE PACKET
510

TRANSMIT THE RESPONSE PACKET TO A SOURCE DEVICE
512

TRANSMIT THE NVME MESSAGE TO THE DATA STORAGE DEVICE ASSOCIATED WITH THE PROCESSING DEVICE
514

TRANSMIT DATA FROM THE DATA STORAGE DEVICE DIRECTLY TO THE NIC VIA A SWITCH BASED ON THE NVME MESSAGE
516

WITH THE NIC, SEGMENT THE DATA INTO A PLURALITY OF DATA SEGMENTS
518

WITH THE NIC, GENERATE A PLURALITY OF DATA PACKETS
520

WITH THE NIC, INSERT THE PLURALITY OF DATA SEGMENTS INTO THE PLURALITY OF DATA PACKETS
522

WITH THE NIC, TRANSMIT THE PLURALITY OF DATA PACKETS TO A SOURCE DEVICE
524

TRANSMIT A NVME COMPLETION MESSAGE FROM THE DATA STORAGE DEVICE TO THE PROCESSING DEVICE
526

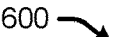

AT A PROCESSING DEVICE, COMPUTE A HTTP/3 HEADER OF A FIRST MESSAGE RECEIVED AT A NIC DEVICE INTO A CONTROL MESSAGE, THE FIRST MESSAGE COMPRISING A WRITE REQUEST
602

TRANSMIT THE CONTROL MESSAGE TO THE NIC
608

COMPUTE AN NVME MESSAGE BASED AT LEAST IN PART ON THE CONTROL MESSAGE
614

COPY THE HTTP/3 HEADER OF THE FIRST MESSAGE TO A CACHE ASSOCIATED WITH THE PROCESSING DEVICE
604

RECEIVE AT THE NIC, A PLURALITY OF DATA PACKETS, THE PLURALITY OF DATA PACKETS COMPRISING A PLURALITY OF DATA SEGMENTS
610

TRANSMIT THE NVME MESSAGE TO A DATA STORAGE DEVICE
616

COMPUTE THE HTTP/3 HEADER OF THE FIRST MESSAGE INTO A CONTROL MESSAGE
606

COALESCE THE PLURALITY OF DATA SEGMENTS INTO A DATA BLOCK
612

TRANSMIT THE DATA BLOCK FROM THE NIC DIRECTLY TO THE DATA STORAGE DEVICE VIA A SWITCH BASED ON THE NVME MESSAGE
618

FIG. 6

APPLICATION—CENTRIC WEB PROTOCOL-BASED DATA STORAGE

TECHNICAL FIELD

The present disclosure relates generally to computing. Specifically, the present disclosure relates to systems and methods for improved data read and write processes and storage.

BACKGROUND

Computing devices of all kinds ubiquitously include data storage devices used to record (e.g., store) information (e.g., data) in a storage medium. Further, most all industries are data-driven resulting in the creation, storing, fetching, analyzing, and presenting of extremely large amounts of data. For at least these reasons, large amounts of data including large data sets are required to be read and written to the data storage devices. With the data being stored on private, public, and hybrid cloud environments, consumers are continually searching for faster input/output per second rates, greater throughput, increased durability, redundancy, and other beneficial qualities in data read/write operations to speed up a myriad of different applications. These applications may include artificial intelligence, machine learning, and low-latency usage, among other applications. Further, observability requirements for using storage have become more stringent not only for quicker troubleshooting and mean time to repair (MTTR), but also for privacy, compliance, and governance.

The above requirements are applicable whether the data storage device is used for attaching to bare metal (BM) storage devices and/or virtual machines (VMs) storage devices that is utilized for block storage, is a storage area network (SAN), is a virtual SAN (vSAN), is utilized for a network-attached storage (NAS) (e.g., a file-level (as opposed to block-level storage) computer data storage server connected to a computer network providing data access to a heterogeneous group of clients), us utilized for object storage (e.g., a computer data storage that manages data as objects, as opposed to other storage architectures such as file systems which manages data as a file hierarchy, and block storage which manages data as blocks within sectors and tracks), or other uses of the data storage devices. Among these, the BM/VM storage may be the most popular and may be locally connected (e.g., Amazon® web services (AWS) instance store, Google® cloud platform (GCP) local) or network connected (e.g., AWS elastic block store (EBS), GCP persistent disk, etc.).

Input/output operations per second (IOPS) is a data storage device performance measure that shows how fast storage media can read and write commands per second. Further, throughput is a measure of a data transfer rate of a data storage device. IOPS, throughput, and other data storage performance measures have not evolved as quickly or to the degree that, for example, network packet forwarding performance (e.g., packets per second (pps), throughput, etc.) has. For example, AWS networking performance such as in, for example, an elastic compute cloud (EC2) may obtain a 100 gigabyte per second (GBps) throughput. However, an AWS EBS throughput with a hard disk drive (HDD) may be less than 500 mebibytes per second (MiBps) (e.g., 1024 Kibibytes (1024 bytes)) and with a solid state drive (SSD) may be less than 4 gibibytes per second (GiBps) with less than 256K IOPS and less than 64 tebibyte (TiB) block size. Further, AWS elastic file system (EFS) has a throughput of less than GBps and less than 500K IOPS. GCP is similar with the persistent disk whether using a local SSD with small computer system interface (SCSI) or non-volatile memory express (NVMe) logical-device interface specifications. In the above examples, it is noted here that one gigabyte (GB) is defined as one-thousand, million (e.g., 1,000,000,000) bytes and one GiB is one-thousand, twenty-four million (e.g., 1, 073, 741, 824) bytes.

A number of impediments that limit data storage performance exist. The impediments include, for example, existing data storage protocols and how these data storage protocols preclude smarter in-storage-device algorithms. These impediments may also include the use of extremely complex and bespoke storage networking protocols such as, for example, internet SCSI (iSCSI) that render a fast path to data storage and associated processing inaccessible to everyday users.

Data storage paradigms may involve writing and reading data blocks (e.g., 4K data blocks) to and from a disk over a peripheral component interconnect express (PCIe) bus to and from a cache of a processing device (central processing unit (CPU)). Networking includes sending and receiving data packets to and from a network interface controller (NIC) over the PCIe bus from/to the CPU's cache. In contrast, data storage operates over a network using techniques such as iSCSI resulting in an impedance mismatch. This overall data read/write processing performs poorly generally because of the use of a memcpy command. The memcpy command provides for the copying of specified bytes of memory from a source address to a destination address. However, the interleave and deinterleave of blocks with a control protocol data unit (PDU) and the subsequent segmentation to transport control protocol (TCP) induces two memcpy commands which results in a significant impact on data read performance. A similar issue exists for incoming blocks from the network that are to be written out to the disk. This involves desegmenting the TCP data stream and deinterleaving the PDUs from the data blocks.

The storage throughput in the above examples is largely limited due to ubiquitous reliance on iSCSI, remote direct memory access (RDMA) protocols, and other protocols that have evolved SCSI protocols to work on internet protocol (IP) and Ethernet networks y mapping SCSI protocol PDUs in the context of a storage area network (SAN). Some advancements such as the Internet Engineering Task Force (IETF) request for comments (RFC) 8154 have expanded SCSI usage by NAS/network file system (NFS) client (e.g., RFC8881) to access block storage. While NVMe protocol with 64k queues and only 13 commands to direct data movement has become viable and practical alternatives to the SCSI protocol and has been used in production deployments, over approximately a decade, NVM Express over Fabrics (NVMe-oF) has not become a viable alternative to iSCSI since supported for it has been limited to a legacy set of lower layer protocols such as, for example, RDMA, RDMA over converged ethernet (RoCE) and fiber channel (FC) protocols, among others. Similarly, hyperscalers are limited by legacy techniques for remote storage.

In summary, current data storage solutions suffer from a number of constraints such as complex protocols that make the current data storage solutions unsuitable to address evolving data storage performance requirements.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates a flow diagram of an example method of performing a direct read operation, according to an example of the principles described herein.

FIG. 6 illustrates a flow diagram of an example method of performing a direct write operation, according to an example of the principles described herein.

DESCRIPTION OF EXAMPLE EMBODIMENTS

Figure 1:
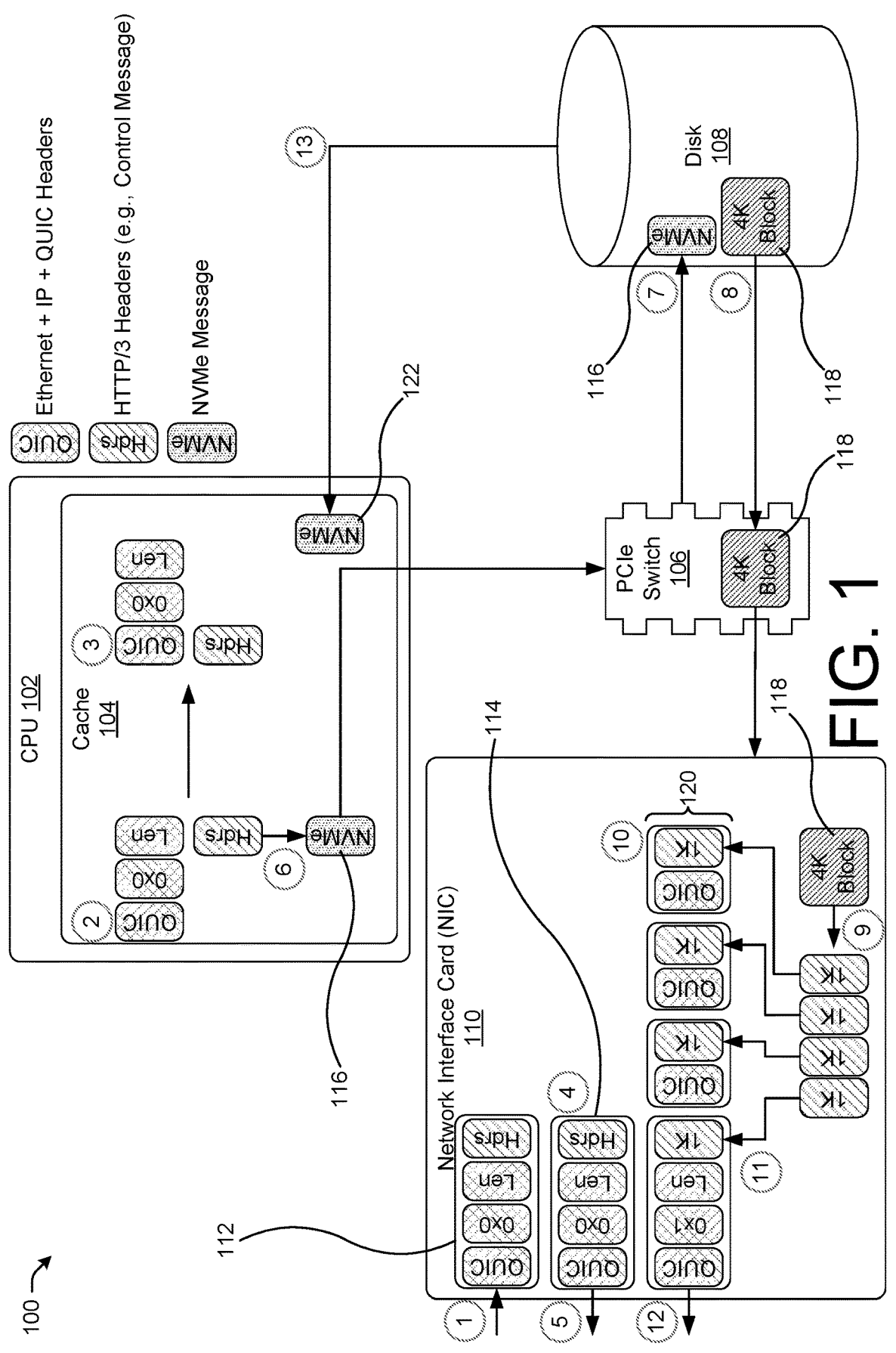
FIG. 1 illustrates a system-architecture diagram of a computing device that utilizes a direct read operation, according to an example of the principles described herein.

As described above, current data storage solutions suffer from a number of constraints such as complex protocols that make the current data storage solutions unsuitable to address evolving data storage performance requirements. However, the present systems and methods provide for the splitting of the control and data flows to ensure that the data is not cached for a read or write operation.

The present systems and methods provide for an efficient, web-application-centric, optimized, data storage solution that enables the data storage performance improvements as well as exposes data storage to application developers by taking advantage of the web protocol hypertext transfer protocol (HTTP) for command and control as well as NIC offload protocols. The solutions described herein simplify the data read and write operations and enables CPU bypass when required. This results in a relatively better data storage performance metrics including IOPS, latency, CPU utilization whether the data storage is used for as BM. VM, container CN, and function as a service (FaaS) computing environments.

As a highlight of a couple of aspects that have regulated data transfer in and out of computing systems, first, data is dealt with and/or processed by a CPU or graphics processing unit (GPU) for intra-chassis needs such as local data transfer (e.g., NVMe for PCIe devices) or inter-chassis need such as remote data transfer (e.g., NVMe-oF). Second, data may be transferred without involving the CPU or GPU for intra-chassis needs such as local data transfer (e.g., RDMA) or inter-chassis needs such as remote data transfer (e.g., RoCE, Internet wide area RDMA Protocol (iWARP) protocol (e.g., in a 1:1 relationship), fiber channel over ethernet (FCoE) protocol, iSCSI protocol (e.g., an m:n relationship), and NFS protocol, among other protocols).

Both of the above aspects are important depending on the data usage for read-write operations or data processing. As to the second aspect above regarding data that may be transferred without involving the CPU or GPU, this makes it possible to attach hundreds or thousands of SSDs in a network which is far more than may be accommodated via PCIe-based systems. The first aspect described above is important since it makes a case of avoiding an input/output (I/O) controller or any special NIC capability, thereby involving CPU/GPU processing. Further, the second aspect described above is important since it makes a case for needing I/O controller or special NIC capability to bypass CPU/GPU processing. The present systems and methods leverage both the first and second aspects described above in an intelligent manner to use a CPU only as needed for better performance and disrupt and optimize both of the two above aspects.

The present systems and methods utilize HTTP version 3 (HTTP/3) headers as an over-the-network control protocol for storage processes. In one example, the HTTP/3 headers are translated to NVMe at the CPU and are used for addressing local disks. In one example, the HTTP/3 headers may be used in connection with a native HPPT/3 message support for the data storage device.

Further, the present systems and methods separate or split the control flow or path from the data flow or path in order to ensure that the data is not cached for a read or write operation. The HTTP/3 headers may be sent to the CPU for processing and decision making as to any read or write operations. Further, the CPOU may direct the transmission of data directly between a data storage device and a NIC such as, via a PCIe bus without having to pass through the intermediate step of being copied to and from the cache associate with the CPU.

Overview

In the examples described herein, systems and methods for improved data storage performance are provided through use of internet protocol (IP)-based command and control processing and network interface controller (NIC) offloading protocols to bypass processing devices and caches.

Examples described herein provide a non-transitory computer-readable medium storing instructions that, when executed, causes a processor to perform operations. The operations may include, at a processing device, computing a hypertext transmission protocol version 3 (HTTP/3) header of a first message received at a network interface controller (NIC) device into a non-volatile memory express (NVMe) message. The operations may further include transmitting the NVMe message to a device associated with the processing device, and, with the NVMe message, transmitting data directly between the NIC and a data storage device.

The first message may include a read request, and the operations may further include copying the HTTP/3 header of the first message to a cache associated with the processing device, generating a response header based on the HTTP/3 header, and transmitting the response header to the NIC. The operations may further include including the response header in a response packet and transmitting the response packet to a source device.

The first message may include a read request. The operations may further include transmitting the NVMe message to the data storage device associated with the processing device, and transmitting data from the data storage device directly to the NIC via a switch based on the NVMe message. The operations may further include, with the NIC, segmenting the data into a plurality of data segments, generating a plurality of data packets, inserting the plurality of data segments into the plurality of data packets, and transmitting the plurality of data packets to a source device. The operations may further include transmitting a NVMe completion message from the data storage device to the processing device.

The first message may include a write request, and the operations may further include copying the HTTP/3 header of the first message to a cache associated with the processing device, computing the HTTP/3 header of the first message into a control message, and transmitting the control message to the NIC. The operations may further include receiving at the NIC, a plurality of data packets, the plurality of data packets comprising a plurality of data segments, and coalescing the plurality of data segments into a data block.

The operations may further include computing the NVMe message based at least in part on the control message, transmitting the NVMe message to a data storage device, and transmitting the data block from the NIC directly to the data storage device via a switch based on the NVMe message.

Examples described herein also provide a method of managing data storage processes. The method may include, at a processing device, computing a hypertext transmission protocol version 3 (HTTP/3) header of a first message received at a network interface controller (NIC) device into a non-volatile memory express (NVMe) message, transmitting the NVMe message to a device associated with the processing device, and with the NVMe message, transmitting data directly between a NIC and the data storage device.

The first message may include a read request, and the method may further include copying the HTTP/3 header of the first message to a cache associated with the processing device, generating a response header based on the HTTP/3 header, and transmitting the response header to the NIC. The method may further include including the response header in a response packet and transmitting the response packet to a source device.

The first message comprises a read request, the method further include transmitting the NVMe message to a data storage device associated with the processing device, and transmitting data from the data storage device directly to the NIC via a switch based on the NVMe message.

The method may further include, with the NIC, segmenting the data into a plurality of data segments, generating a plurality of data packets, inserting the plurality of data segments into the plurality of data packets, and transmitting the plurality of data packets to a source device. The method may further include transmitting a NVMe completion message from the data storage device to the processing device.

The first message may include a write request, and the method may further include copying the HTTP/3 header of the first message to a cache associated with the processing device, computing the HTTP/3 header of the first message into a control message, and transmitting the control message to the NIC. The method may further include receiving, at the NIC, a plurality of data packets. The plurality of data packets may include a plurality of data segments. The method may further include coalescing the plurality of data segments into a data block.

The method may further include computing the NVMe message based at least in part on the control message, transmitting the NVMe message to the data storage device, and transmitting the data block from the NIC directly to the data storage device via a switch based on the NVMe message.

Examples described herein also provide a system including a processor, and a non-transitory computer-readable media storing instructions that, when executed by the processor, causes the processor to perform operations. The operations may include, at the processor, computing a hypertext transmission protocol version 3 (HTTP/3) header of a first message received at a network interface controller (NIC) device into a non-volatile memory express (NVMe) message, transmitting the NVMe message to a device associated with the processor, and, with the NVMe message, transmitting data directly between a NIC and the data storage device.

The first message may include a read request, and the operations may further include copying the HTTP/3 header of the first message to a cache associated with the processor and generating a response header based on the HTTP/3 header. The operations may further include transmitting the response header to the NIC, including the response header in a response packet, and transmitting the response packet to a source device. The operations may further include transmitting the NVMe message to the data storage device associated with the processor, and transmitting data from the data storage device directly to the NIC via a switch based on the NVMe message. The operations may further include, with the NIC, segmenting the data into a plurality of data segments, generating a plurality of data packets, inserting the plurality of data segments into the plurality of data packets, and transmitting the plurality of data packets to a source device. The operations may further include transmitting a NVMe completion message from the data storage device to the processor.

The first message may include a write request, and the operations further include copying the HTTP/3 header of the first message to a cache associated with the processor, computing the HTTP/3 header of the first message into a control message, and transmitting the control message to the NIC. The operations may further include receiving, at the NIC, a plurality of data packets, the plurality of data packets comprising a plurality of data segments, coalescing the plurality of data segments into a data block, and computing the NVMe message based at least in part on the control message. The operations may further include transmitting the NVMe message to the data storage device, and transmitting the data block from the NIC directly to the data storage device via a switch based on the NVMe message. The first message may include a QUIC header, a type value, a length, and an HTTP header.

Additionally, the techniques described in this disclosure may be performed as a method and/or by a system having non-transitory computer-readable media storing computer-executable instructions that, when executed by one or more processors, performs the techniques described above.

Example Embodiments

Turning now to the figures, FIG. 1 illustrates a system-architecture diagram of a computing device 100 that utilizes a direct read operation, according to an example of the principles described herein. The computing device 100 may include a processing device such as the CPU 102. As illustrated, the computing device 100 may include one or more hardware processor(s) such as the CPU 102 configured to execute one or more stored instructions. The CPU 102 may include one or more data processing cores. Further, a cache 104 may be associated with the CPU 102. The cache 104 may include any hardware or software component that stores data so that future requests for that data may be served faster and the data stored in the cache may be the result of an earlier computation or a copy of data stored elsewhere.

The computing device 100 may further include a disk 108. The disk 108 may include any physical or virtual data storage device that may be used for recording (e.g., storing) of information (e.g., data) and to and from which may be written and read. The disk 108 may be communicatively coupled to the CPU 102 via a bus including any communication system that transfers data between components within the computing device 100 or between the computing device 100 and another computing device (not shown). The disk 108 may include, for example, a flash memory data storage device such as a solid-state drive (SSD). However, the disk 108 may include any type of data storage device including, but not limited to, an electronic, magnetic, optical, electro-magnetic, infrared, or semiconductor system, apparatus, or device, or any suitable combination of the foregoing types of data storage devices.

A bus may include any related hardware components (e.g., wire, optical fiber, etc.) and software, including communication protocols that function to transmit data. In the example of FIG. 1, the bus may include a PCIe switch 106. However, any bus that utilizes any communication protocols may be used.

The CPU 102 and disk 108 may be coupled to a NIC 110 via the PCIe switch 106. The NIC 110 may include any computer hardware component that connects the computing device 100 to a computer network and other computing devices within the computer network. The NIC 110 may include electronic circuitry to communicate using any physical layer and data link layer standards to provide a base for a full network protocol stack, allowing communication among computers on the same local area network (LAN) and large-scale network communications through routable protocols, such as Internet Protocol (IP). The NIC 110 may also include hardware and software that allows computing devices to communicate over a computer network through wired or wireless communications. In one example, the NIC 110 may include both a physical layer and data link layer device to provide physical access to a networking medium and, for Institute of Electrical and Electronics Engineers (IEEE) 802 standards-based networks and similar networks and provides a low-level addressing system through the use of MAC addresses that are uniquely assigned to network interfaces. In the examples described herein, the NIC 110 may communicate with a number of computing devices (not shown) communicatively coupled to the computing device 100.

The computing device 100 may include other computing elements and devices not shown. However, having described the CPU 102, cache 104, the PCIe switch 106, the disk 108, and the NIC 110, we will now describe the process by which these devices within the computing device 100 separate the control plane from the data plane and provides for the direct transfer of data between the NIC 110 and the disk 108 (e.g., read and write operations) via the PCIe switch 106 without caching the data within the cache 104. This methods associated with read and write operations are indicated by numbered elements in FIGS. 1 and 2. As indicated above, FIG. 1 illustrates a system-architecture diagram of the computing device 100 that utilizes a direct read operation, according to an example of the principles described herein. The direct read operation of FIG. 1 may include receiving, at 1, a read request 112 from a computing device (not shown) communicatively coupled to the computing device 100 via the NIC 110. The read request may include an HTTP/3 GET command. The read request 112 may include a general-purpose transport layer network protocol header such as a QUIC header as depicted in FIG. 1. HTTP/3 provides a transport for HTTP semantics using the QUIC transport protocol and an internal framing layer, and, therefore, the QUIC headers are utilized. Once a networked device knows that an HTTP/3 server exists at a certain endpoint, it may open a QUIC connection. QUIC provides protocol negotiation, stream-based multiplexing, and flow control. Within each stream, the basic unit of HTTP/3 communication may include a frame. Each frame type may serve a different purpose. For example, headers frames and data frames form the basis of HTTP/3 requests and responses. Frames that apply to the entire connection are conveyed on a dedicated control stream.

Thus, the read request 112 may further include a data frame (e.g., type 0x0 as depicted in FIG. 1). The data frames convey arbitrary, variable-length sequences of bytes associated with an HTTP/3 request or response payload. A length frame that includes a variable-length integer (e.g., "Len" as depicted in FIG. 1) and that describes the length of the frame payload may also be included in the read request 112. This length does not include the type field as does the data frame. The read request 112 may also include a number of HTTP/3 headers (e.g., "Hdrs" as depicted in FIG. 1).

At 2 of FIG. 1, the NIC 110 sends the read request 112 to the cache 104 of the CPU 102. At 2, the header segments (e.g., QUIC header, data frame, length frame, and HTTP/3 headers) may be separated in the cache 104. The headers of the read request 112 may be copied within the cache 104 at 3 in order to prepare response headers for a response message for the read request 112. In one example, the response controlled and defined by the CPU 102 may include a response to the requesting computing device (not shown) is not allowed access to the disk 108 and is not allowed to obtain data stored within the disk 108. In one example, the response controlled and defined by the CPU 102 may include a response to the requesting computing device (not shown) is allowed access to the disk 108 and is allowed to obtain data stored within the disk 108. In this manner, the CPU 102 may maintain control with regard to what data may be read from and/or written to the disk 108.

Assuming the CPU 102 allows for the requesting computing device (not shown) to be allowed access to the disk 108 and to be allowed to obtain data stored within the disk 108, the response headers created at 3 may be copied to or sent to the NIC 110 at 4 and placed in a response packet 114. At 5, the response packet 114 may be sent to the requesting computing device (not shown). The response packet 114 may inform the requesting computing device (not shown) to expect a response to the original read request 112 received at 1.

At 6, the CPU 102 may translate the headers of the read request 112 sent to the cache 104 of the CPU 102 by the NIC 110 at 2 into an NVMe message 116 as indicated in FIG. 1. The NVMe message 116 may include any message that utilizes NVMe data transfer protocol used for accessing data quickly from data storage devices including the disk 108. NVMe specifications define how host software communicates with non-volatile memory across multiple transports like PCIe, RDMA, and TCP, among others. NVMe is utilized in connection with and is the industry standard for SSDs in all form factors such as, for example, U.2, M.2, add in card (AIC), and enterprise and datacenter standard form factor EDSFF, among other form factors. The NVMe base specification defines a protocol for host software executed by, for example, the CPU 102, to communicate with non-volatile memory subsystems over a variety of memory-based transports and message-based transports. An NVMe I/O command set specification may be utilized to define data structures, features, log pages, commands, and status values that extend the NVMe base specification. Further, NVMe transport specifications may be utilized to define the binding of the NVMe protocol including controller properties to a specific transport. Older storage connection interfaces such as serial attached SCSI (SAS) and serial advanced technology attachment (SATA) may cause bottlenecks in in a network since they were designed for use with much slower HDDs and tape-based memory. NVMe, however, is designed to take advantage of an SSD memory's greater speed and better support for parallelism.

When the CPU 102 translates the headers of the read request 112 into the NVMe message 116, the CPU 102 may include instructions within the NVMe message 116 as to which data 118 within the disk 108 is to be transmitted from the disk 108 to the NIC 110 for consumption by the external computing device (not shown). The instructions regarding this target data (e.g., 4K data block 118) may be based on the read request 112 and the specific data requested by the external computing device (not shown) located on the disk 108. At 7 of FIG. 1, the NVMe message 116 may be transmitted to the disk 108.

At 8, the data 118 (e.g., a 4K data block 118) may be identified by the NVMe message 116, and the NVMe message 116 may instruct the disk 108 to directly transmit the data 118 to the NIC 110 via the PCIe switch 106 as indicated in FIG. 1. In this matter, the data 118 is not copied to the cache 104 but is, instead, sent directly between the disk 108 and the NIC 110.

Figure 2:
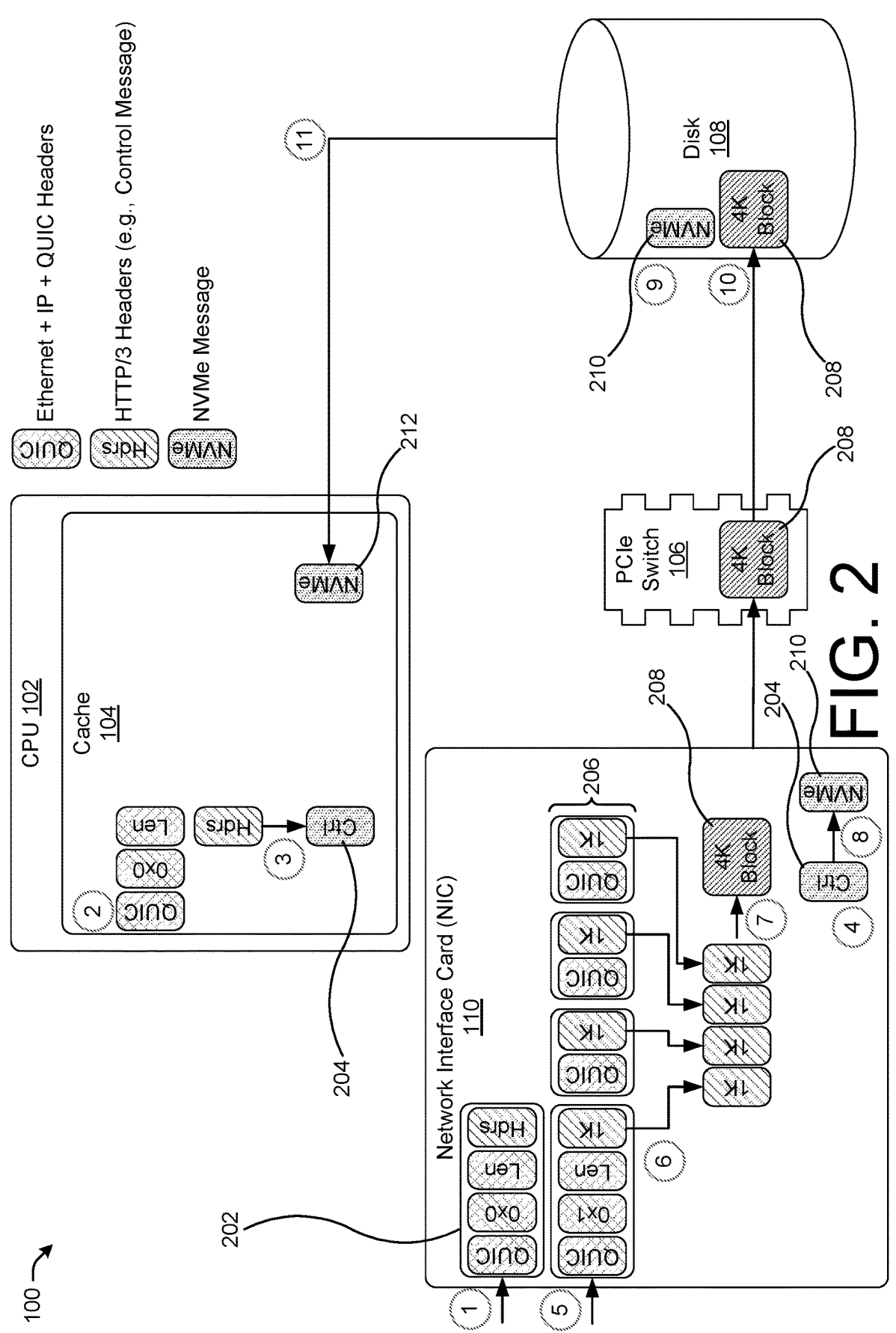
FIG. 2 illustrates a system-architecture diagram of a computing device that utilizes a direct write operation, according to an example of the principles described herein.

At 9, the NIC 110 may split the 4K data block 118 into four separate 1K segments in preparation for encapsulation and transmission to the external computing device (not shown). The data 118 may be separated in this manner since 1K segments are guaranteed to always fit in a given packet. A number of QUIC/HTTP packets 120 are generated by the NIC 110 at 10. The QUIC/HTTP packets 120 may further include a data frame (e.g., type 0x1 as depicted in FIG. 2). The data frame type 0x1 is used to carry a header block, compressed using QPACK. The QUIC/HTTP packets 120 convey arbitrary, variable-length sequences of bytes associated with an HTTP/3 request or response payload. A length frame that includes a variable-length integer (e.g., "Len" as depicted in FIG. 2) and that describes the length of the frame payload may also be included in the QUIC/HTTP packets 120. This length does not include the type field as does the data frame.

The NIC 110 places the segmented 1K data blocks into the QUIC/HTTP packets 120. At 12, the NIC 110 may transmit the QUIC/HTTP packets 120 to the external computing device (not shown) as originally requested in the read request 112. In one example, and at 13, the disk 108 may send a NVMe completion message 122 to the CPU 102 in order to inform the CPU 102 that the transmission of the data 118 to the NIC 110 and the read request has been completed. The above method may be performed any number of times the NIC receives a read request 112.

As mentioned above, a write operation may also be formed using the present systems and methods in addition to a read operation. FIG. 2 illustrates a system-architecture diagram of the computing device 100 that utilizes a direct write operation, according to an example of the principles described herein. A writing operation provided by the computing device 100 of FIG. 2 may include receiving a write request 202 at the NIC 110 at 1. The write request 202 may be received from a computing device (not shown) communicatively coupled to the computing device 100. The write request may include an HTTP/3 PUT command. The write request may include a general-purpose transport layer network protocol header such as a QUIC header as depicted in FIG. 2. The write request 202 may further include a data frame (e.g., type 0x0 as depicted in FIG. 2). The data frames convey arbitrary, variable-length sequences of bytes associated with an HTTP/3 request or response payload. A length frame that includes a variable-length integer (e.g., "Len" as depicted in FIG. 2) and that describes the length of the frame payload may also be included in the write request 202. This length does not include the type field as does the data frame. The write request 202 may also include a number of HTTP/3 headers (e.g., "Hdrs" as depicted in FIG. 2).

At 2, the NIC 110 may copy the HTTP/3 headers to the cache 104. During the coping at 2, the header segments including the QUIC header, the data frame, the length frame, and the HTTP/3 headers. The request headers (e.g., the HTTP/3 headers) may be translated or computed into a control message 204 (e.g., "Ctrl" at depicted in FIG. 2). The control message 204 may be produced by the CPU 102 and may include instructions to the NIC 110 to send data in subsequently-received QUIC/HTTPs packet(s) 206 to a destination including a destination on the disk 108.

At 4, the control message 204 may be sent to the NIC 110 for use by the NIC in controlling the transmission of data from the NIC 110 to the disk 108. The QUIC/HTTPs packet(s) 206 referred to above may be received at 5. In one example, the QUIC/HTTPs packet(s) 206 may include a number of 1K blocks of data as depicted in FIG. 2. At 6, the NIC 110 may extract the 1K blocks of data from the QUIC/HTTPs packet(s) 206, and at 7, the NIC 110 may coalesce the 1K blocks into a 4K data block 208 of data.

The NIC 110 may translate or compute the control message 204 into a NVMe message 210 similar to the NVMe message 116 of FIG. 1. The NVMe message 210 may include instructions as to the destination within the disk 108 where the data (e.g., the 4K data block 208) is to be stored. The instructions regarding this target destination within the disk 108 may be based on the write request 202 received at the NIC 110 that may identify the data, the type of data, and/or the destination on the disk 108. The NIC 110 may send the NVMe message 210 to the disk 108 at 9. The NIC 110 may directly transmit the 4K data block 208 to the disk 108 via the PCIe switch 106 based on the control message 204 at 10, and the NVMe message 210 may cause the 4K data block 208 to be stored at the destination within the disk 108. In one example, and at 11, the disk 108 may send a NVMe completion message 122 to the CPU 102 in order to inform the CPU 102 that the transmission of the data 118 to the disk 108 and the write operation has been completed. The above method may be performed any number of times the NIC receives a write request 202.

Figure 3:
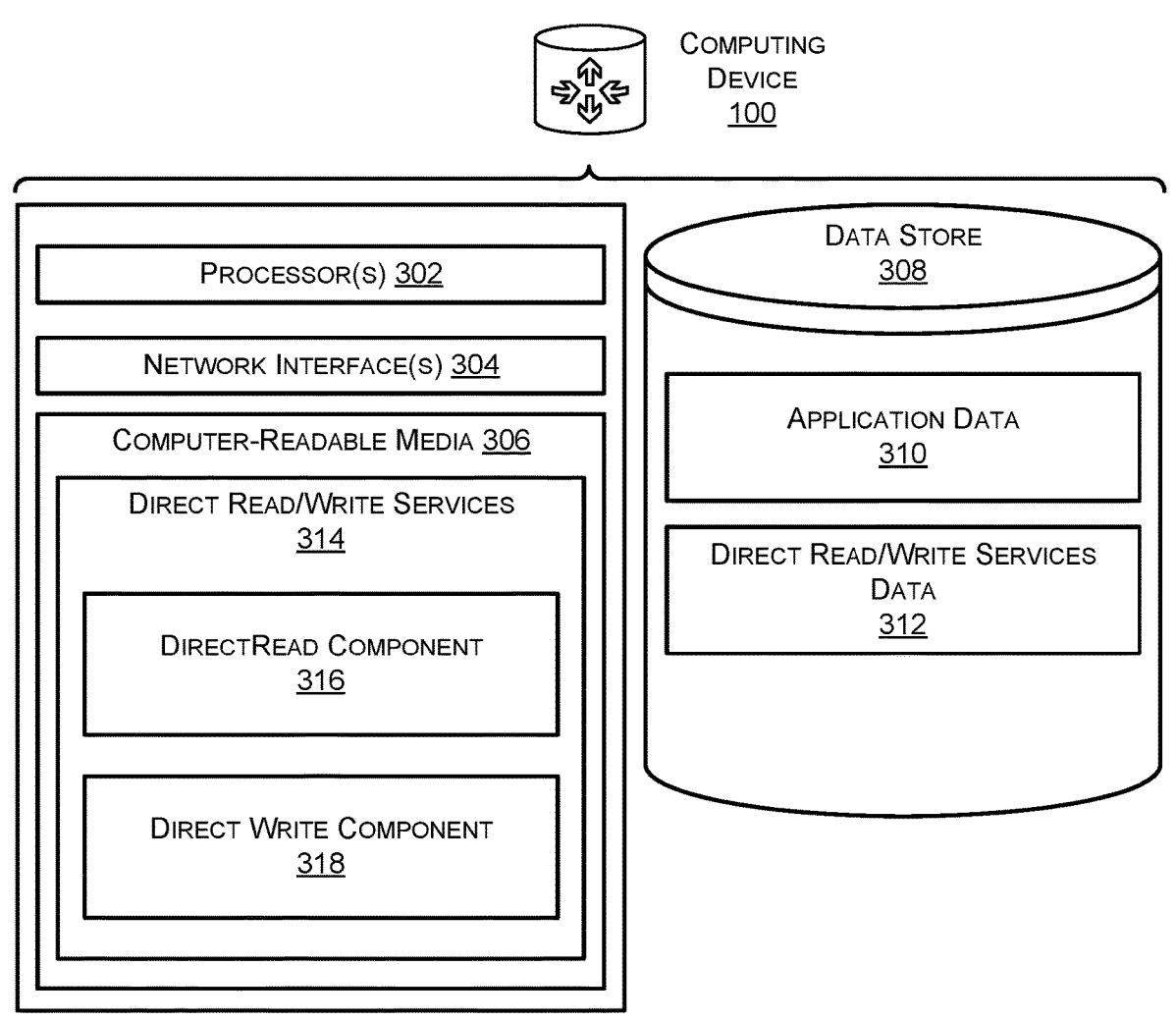
FIG. 3 is a component diagram of example components of a computing device including direct read/write services, according to an example of the principles described herein.

FIG. 3 is a component diagram of example components of a computing device 100 including direct read/write services 614, according to an example of the principles described herein. As illustrated, the computing device 100 may include one or more hardware processor(s) 302 configured to execute one or more stored instructions. The processor(s) 302 may comprise one or more cores. In one example, the processor(s) 302 may include the CPU 102 of FIGS. 1 and 2. Further, the computing device 100 may include one or more network interfaces 304 configured to provide communications between the computing device 100 and other devices, such as devices associated with the system architecture of FIG. 1 including an external computing device (not shown) and any network devices, the PCIe switch 106, the disk 108, the NIC 110, and/or other systems or devices associated with the computing device 100 and/or remote from the computing device 100. The network interfaces 304 may include devices configured to couple to personal area networks (PANs), wired and wireless local area networks (LANs), wired and wireless wide area networks (WANs), and so forth. For example, the network interfaces 304 may include devices compatible with the external computing device (not shown) and any network devices, the PCIe switch 106, the disk 108, the NIC 110, and/or other systems or devices associated with the computing device 100 and/or remote from the computing device 100 and/or other systems or devices associated with the computing device 100.

The computing device 100 may also include computer-readable media 306 that stores various executable components (e.g., software-based components, firmware-based components, etc.). In one example, the computer-readable media 306 may include, for example, working memory, random access memory (RAM), read only memory (ROM), and other forms of persistent, non-persistent, volatile, non-volatile, and other types of data storage. In addition to various components discussed herein, the computer-readable media 306 may further store components to implement functionality described herein. While not illustrated, the computer-readable media 306 may store one or more operating systems utilized to control the operation of the one or more devices that comprise the computing device 100. According to one example, the operating system comprises the LINUX operating system. According to another example, the operating system(s) comprise the WINDOWS SERVER operating system from MICROSOFT Corporation of Redmond, Washington. According to further examples, the operating system(s) may comprise the UNIX operating system or one of its variants. It may be appreciated that other operating systems may also be utilized.

Additionally, the computing device 100 may include a data store 308 which may comprise one, or multiple, repositories or other storage locations for persistently storing and managing collections of data such as databases, simple files, binary, and/or any other data. In one example, the data store 308 may be associated with or form at least part of the disk 108 of FIGS. 1 and 2. The data store 308 may include one or more storage locations that may be managed by one or more database management systems. The data store 308 may store, for example, application data 310 defining computer-executable code utilized by the processor 302 to execute the direct read/write services 314.

Further, the data store 308 may store direct read/write services data 312. The direct read/write services data 312 may include any data used in executing the direct read/write services 314. For example, the direct read/write services data 312 may include any data defining data to be read or written to the disk 108 as defined by the read request 112 and the write request 202, respectively; any data defining a destination or location on the disk 108 as to where the data is to be read from or written to; data related to the NVMe message 116, 210 and/or the control message 204, other data associated with the reading and writing of data to and from the disk 108, and combinations thereof.

The computer-readable media 306 may store portions, or components, of direct read/write services 314. For example, the direct read/write services 314 of the computer-readable media 306 may include a direct read component 316 to, when executed by the processor(s) 302, perform the direct read method described herein in connection with FIGS. 1, 4, and 5. The direct read component 316 may cause data read from the disk 108 to be directly sent from the disk 108 to the NIC 110 via the PCIe switch 106 without being transmitted to the cache 104 of the CPU 102. The direct read component 316 may include all or a portion of the executable code associated with the creation of the NVMe message 116 and/or the NVMe completion message 122 that defines the manner in which data is directly read from the disk 108 and the manner in which the direct read request is indicated as having been completed.

Figure 4:
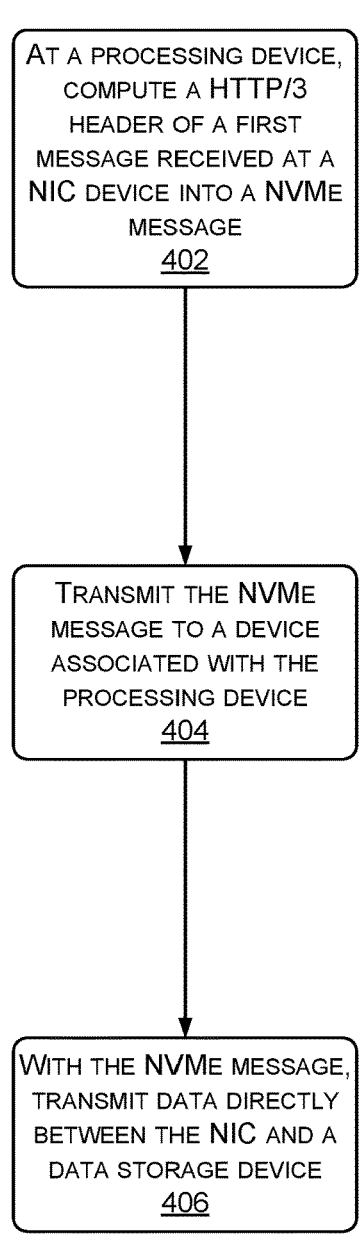
FIG. 4 illustrates a flow diagram of an example method for of performing a direct read or write operation, according to an example of the principles described herein.

The direct read/write services 314 of the computer-readable media 306 may also include a direct write component 318 to, when executed by the processor(s) 302, perform the direct write method described herein in connection with FIGS. 1, 4, and 6. The direct write component 318 may cause data written to the disk 108 to be directly sent from the NIC 110 via the PCIe switch 106 to the disk 108 without being transmitted to the cache 104 of the CPU 102. The direct write component 318 may include all or a portion of the executable code associated with the creation of the control message 204, the NVMe message 210 and/or the NVMe completion message 212 that defines the manner in which data is directly written to the disk 108 and the manner in which the direct write request is indicated as having been completed.

FIG. 4 illustrates a flow diagram of an example method 400 for of performing a direct read or write operation, according to an example of the principles described herein. The method of FIG. 4 includes any read and write operations associated with examples described herein. The method 400 of FIG. 4 may include, at a processing device such as the CPU 102, computing a hypertext transmission protocol version 3 (HTTP/3) header of a first message received at a network interface controller (NIC) device 110 into a non-volatile memory express (NVMe) message at 402. At 404, the NVMe message may be transmitted to a device associated with the processing device such as the NIC 110 and/or the disk 108. At 406 and with the NVMe message, data may be directly transmitted between the NIC 110 and a data storage device (e.g., the disk 108).

FIG. 5 illustrates a flow diagram of an example method 500 of performing a direct read operation, according to an example of the principles described herein. The method 500 of FIG. 5 may include, at 502 and at a processing device (e.g., the CPU 102), computing an HTTP/3 header of a first message received at the NIC device (e.g., NIC 110) into a non-volatile memory express (NVMe) message 116. In one example, the first message may include the read request 112 from a computing device (not shown) communicatively coupled to the computing device 100 via the NIC 110. In one example, the CPU 102 may determine whether the read request 112 should be processed at all based on a separate determination as to whether the external computing device (not shown) has access to the disk 108 and/or the computing device 100.

At 504, the method 500 may further include copying the HTTP/3 header of the first message to the cache 104 associated with the processing device (e.g., the CPU 102). The CPU 102 may generate a response header based on the HTTP/3 header at 504. At 506, the response header may be transmitted to the NIC 110. At 508, the CPU 102 may transmit the response header to the NIC 110. The NIC 110 may generate a response packet 114 and include the response header in the response packet 114 at 510. At 512, the NIC 110 may transmit the response packet 114 to a source device that sent the read request 112 such as the external computing device (not shown) as described herein.

At 514, the NVMe message 116 may be transmitted to the data storage device (e.g., the disk 108) associated with the processing device (e.g., the CPU 102). Further, at 516, data (e.g., 4K data block 118) may be transmitted from the data storage device (e.g., the disk 108) directly to the NIC 110 via a switch (e.g., the PCIe switch 106) based on the NVMe message 116 and the instructions provided by the NVMe message 116 by the CPU 102 and based on the original read request 112.

The NIC 110, at 518, may segment the data (e.g., the 4K data block 118) into a plurality of data segments such as into 1K data segments. At 520, the NIC 110 may further generate a plurality of data packets (e.g., the number of QUIC/HTTP packets 120). The NIC 110 may insert the plurality of data segments into the plurality of data packets at 522. The plurality of data packets (e.g., the number of QUIC/HTTP packets 120) may be transmitted to the source device (e.g., the external computing device (not shown)) at 524.

In one example, the disk 108 or other device may transmit an NVMe completion message 122 from the data storage device (e.g., the disk 108) to the processing device (e.g., the CPU 102) at 526. In one example, once the NVMe message 116 has provided its instructions to the disk 108 to transmit the 4K data block 118 of data to the NIC 110, the disk 108 may transmit the NVMe message 116 or a derivative of the NVMe message 116 in the form of the NVMe completion message 122 to indicate to the CPU 102 that the request within the read request 112 has been fulfilled.

The operations described herein also include write operations to allow for the writing of data to the disk 108. FIG. 6 illustrates a flow diagram of an example method 600 of performing a direct write operation, according to an example of the principles described herein. The method 600 of FIG. 6 may include, at 602 and at a processing device (e.g., the CPU 102), computing an HTTP/3 header of a first message received at the NIC device (e.g., NIC 110) into a control message 204. In one example, the first message may include the write request 202 from an external computing device (not shown) communicatively coupled to the computing device 100 via the NIC 110. In one example, the CPU 102 may determine whether the write request 202 should be processed at all based on a separate determination as to whether the external computing device (not shown) has access to the disk 108 and/or the computing device 100.

The write operations described by FIG. 6 may also include copying the HTTP/3 header of the first message (e.g., the write request 202) to the cache 104 associated with the processing device (e.g., the CPU 102) at 604 using an interaction between the NIC 110 and the CPU 102. At 606, the CPU 102 may compute the HTTP/3 header of the first message into a control message 204. The CPU 102 may, at 608, transmit the control message 204 to the NIC 110.

At 610, the NIC 110 may receive a plurality of data packets 206. The plurality of data packets 206 may include a plurality of data segments such as, for example, 1K data segments. The NIC 110 may coalesce the plurality of data segments at 612 into a data block such as, for example, the 4K data block 208.

The NIC 110, at 614, may compute an NVMe message 210 based at least in part on the control message 204 sent to the NIC 110. The NIC 110, at 616, may also transmit the NVMe message 210 to a data storage device (e.g., the disk 108) in order to prepare for the reception of the 4K data block 208 at the disk 108 and to instruct the disk 108 to place the 4K data block 208 at a destination on the disk 108. At 618, the NIC 110 may transmit the data block (e.g., the 4K data block 208) from the NIC 110 directly to the data storage device (e.g., the disk 108) via a switch (e.g., the PCIe switch 106) based on the control message 204 and/or the NVMe message 210. In one example, the disk 108 or other device may transmit an NVMe completion message 212 from the data storage device (e.g., the disk 108) to the processing device (e.g., the CPU 102). In one example, once the NVMe message 210 has provided its instructions to the disk 108 to store the 4K data block 208 of data at a destination within the disk 108, the disk 108 may transmit the NVMe message 210 or a derivative of the NVMe message 210 in the form of the NVMe completion message 212 to indicate to the CPU 102 that the request within the write request 202 has been fulfilled.

Figure 7:
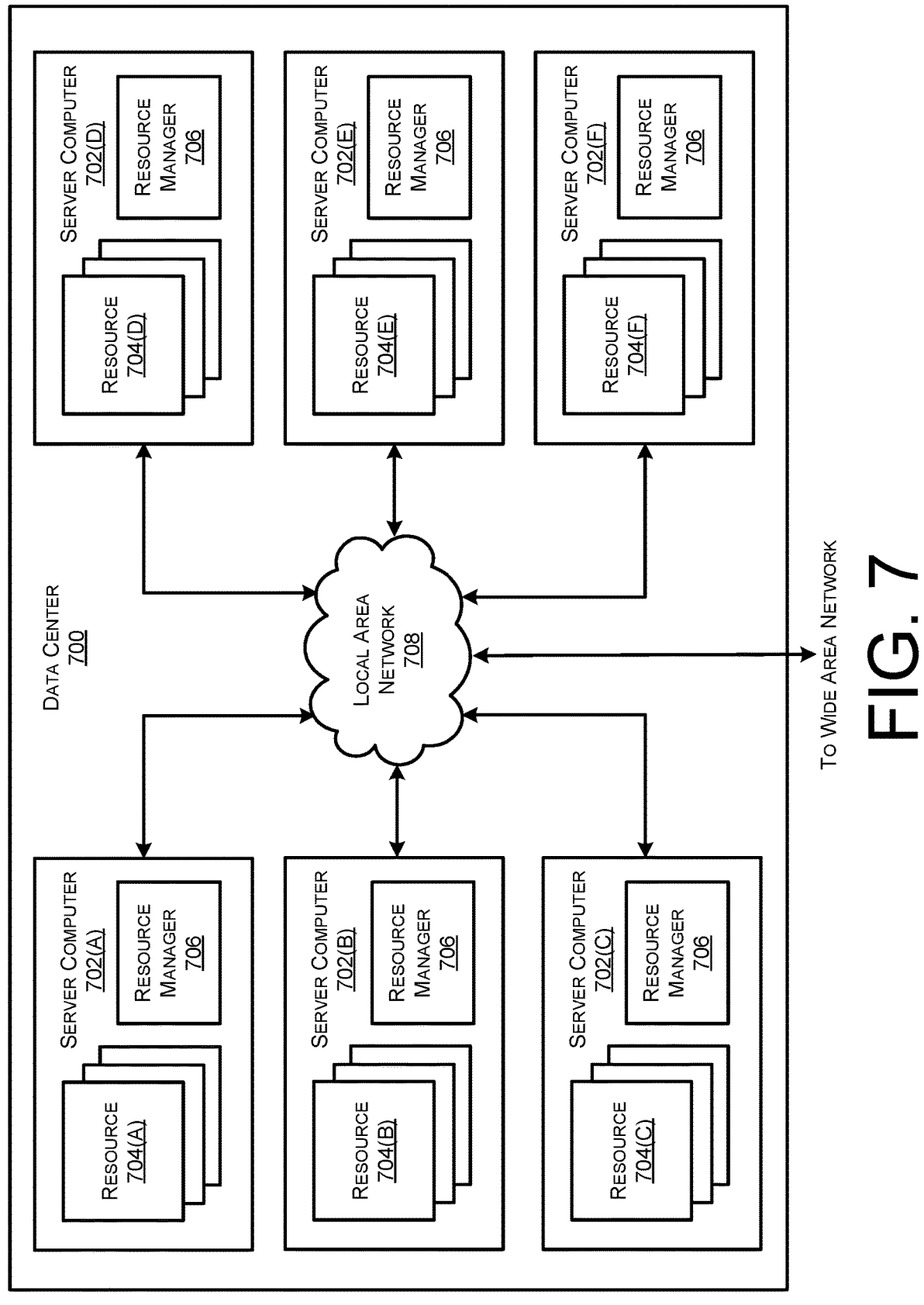
FIG. 7 illustrates a computing system diagram illustrating a configuration for a data center that may be utilized to implement aspects of the technologies disclosed herein.

FIG. 7 illustrates a computing system diagram illustrating a configuration for a data center 700 that may be utilized to implement aspects of the technologies disclosed herein. The example data center 700 shown in FIG. 7 includes several server computers 702A-702F (which might be referred to herein singularly as "a server computer 702" or in the plural as "the server computers 702) for providing computing resources. In some examples, the resources and/or server computers 702 may include, or correspond to, any type of networked device described herein. Although described as servers, the server computers 702 may comprise any type of networked device, such as servers, switches, routers, hubs, bridges, gateways, modems, repeaters, access points, etc.

The server computers 702 may be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, virtual private networks (VPNs), and others. Some of the server computers 702 may also be configured to execute a resource manager 706 capable of instantiating and/or managing the computing resources. In the case of VM instances, for example, the resource manager 706 may be a hypervisor or another type of program configured to enable the execution of multiple VM instances on a single server computer 702. Server computers 702 in the data center 700 may also be configured to provide network services and other types of services.

In the example data center 700 shown in FIG. 7, an appropriate LAN 708 is also utilized to interconnect the server computers 702A-702F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 700, between each of the server computers 702A-702F in each data center 700, and, potentially, between computing resources in each of the server computers 702. It may be appreciated that the configuration of the data center 700 described with reference to FIG. 7 is merely illustrative and that other implementations may be utilized.

In some examples, the server computers 702 and or the computing resources 704 may each execute/host one or more tenant containers and/or virtual machines to perform techniques described herein.

In some instances, the data center 700 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 704 provided by the cloud computing network may include various types of computing resources, such as data processing resources like tenant containers and VM instances, data storage resources, networking resources, data communication resources, network services, VPN instances, and the like.

Each type of computing resource 704 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 704 not mentioned specifically herein.

The computing resources 704 provided by a cloud computing network may be enabled in one example by one or more data centers 700 (which might be referred to herein singularly as "a data center 700" or in the plural as "the data centers 700). The data centers 700 are facilities utilized to house and operate computer systems and associated components. The data centers 700 typically include redundant and backup power, communications, cooling, and security systems. The data centers 700 may also be located in geographically disparate locations. One illustrative example for a data center 700 that may be utilized to implement the technologies disclosed herein is described herein with regard to, for example, FIGS. 1 through 6.

Figure 8:
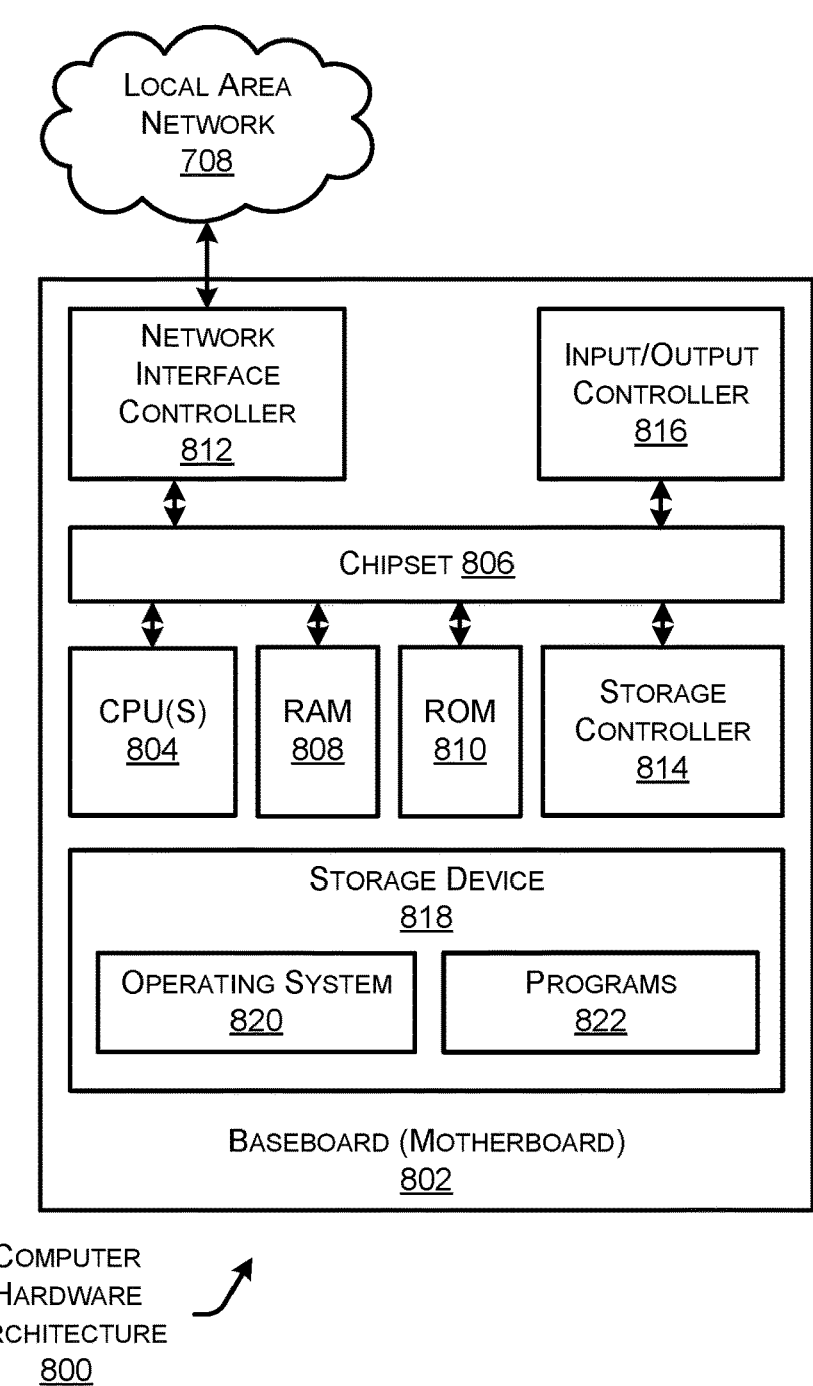
FIG. 8 illustrates a computer architecture diagram showing an example computer hardware architecture for implementing a computing device that may be utilized to implement aspects of the various technologies presented herein.

FIG. 8 illustrates a computer architecture diagram showing an example computer hardware architecture 800 for implementing a computing device that may be utilized to implement aspects of the various technologies presented herein. The computer hardware architecture 800 shown in FIG. 8 illustrates the external computing device (not shown) and any network devices, the PCIe switch 106, the disk 108, the NIC 110, and/or other systems or devices associated with the computing device 100 and/or remote from the computing device 100, a workstation, a desktop computer, a laptop, a tablet, a network appliance, an e-reader, a smartphone, or other computing device, and may be utilized to execute any of the software components described herein. The computer 800 may, in some examples, correspond to a network device (e.g., the external computing device (not shown) and any network devices, the PCIe switch 106, the disk 108, the NIC 110, and/or other systems or devices associated with the computing device 100 and/or remote from the computing device 100) described herein, and may comprise networked devices such as servers, switches, routers, hubs, bridges, gateways, modems, repeaters, access points, etc.

The computer 800 includes a baseboard 802, or "motherboard," which is a printed circuit board to which a multitude of components or devices may be connected by way of a system bus or other electrical communication paths. In one illustrative configuration, one or more central processing units (CPUs) 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory (ROM) 810 or non-volatile RAM (NVRAM) for storing basic routines that help to startup the computer 800 and to transfer information between the various components and devices. The ROM 810 or NVRAM may also store other software components necessary for the operation of the computer 800 in accordance with the configurations described herein.

The computer 800 may operate in a networked environment using logical connections to remote computing devices and computer systems through a network, such as the external computing device (not shown) and any network devices, the PCIe switch 106, the disk 108, the NIC 110, and/or other systems or devices associated with the computing device 100 and/or remote from the computing device 100, among other devices. The chipset 806 may include functionality for providing network connectivity through a Network Interface Controller (NIC) 812, such as a gigabit Ethernet adapter. The NIC 812 is capable of connecting the computer 800 to other computing devices within the computing device 100 and external to the computing device 100. It may be appreciated that multiple NICs 812 may be present in the computer 800, connecting the computer to other types of networks and remote computer systems. In some examples, the NIC 812 may be configured to perform at least some of the techniques described herein, such as packet redirects and/or other techniques described herein.

The computer 800 may be connected to a storage device 818 that provides non-volatile storage for the computer. The storage device 818 may store an operating system 820, programs 822 (e.g., any computer-readable and/or computer-executable code described herein), and data, which have been described in greater detail herein. The storage device 818 may be connected to the computer 800 through a storage controller 814 connected to the chipset 806. The storage device 818 may consist of one or more physical storage units. The storage controller 814 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 800 may store data on the storage device 818 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 818 is characterized as primary or secondary storage, and the like.

For example, the computer 800 may store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the storage device 818 by detecting the physical states or characteristics of one or more particular locations within the physical storage units.

In addition to the storage device 818 described above, the computer 800 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 800. In some examples, the operations performed by the external computing device (not shown) and any network devices, the PCIe switch 106, the disk 108, the NIC 110, and/or other systems or devices associated with the computing device 100 and/or remote from the computing device 100, and or any components included therein, may be supported by one or more devices similar to computer 800. Stated otherwise, some or all of the operations performed by the external computing device (not shown) and any network devices, the PCIe switch 106, the disk 108, the NIC 110, and/or other systems or devices associated with the computing device 100 and/or remote from the computing device 100, and or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 818 may store an operating system 820 utilized to control the operation of the computer 800. According to one example, the operating system 820 comprises the LINUX operating system. According to another example, the operating system comprises the WINDOWS® SERVER operating system from MICROSOFT Corporation of Redmond, Washington. According to further examples, the operating system may comprise the UNIX operating system or one of its variants. It may be appreciated that other operating systems may also be utilized. The storage device 818 may store other system or application programs and data utilized by the computer 800.

In one example, the storage device 818 or other computer-readable storage media is encoded with computer-executable instructions which, when loaded into the computer 800, transform the computer from a general-purpose computing system into a special-purpose computer capable of implementing the examples described herein. These computer-executable instructions transform the computer 800 by specifying how the CPUs 804 transition between states, as described above. According to one example, the computer 800 has access to computer-readable storage media storing computer-executable instructions which, when executed by the computer 800, perform the various processes described above with regard to FIGS. 1 through 7. The computer 800 may also include computer-readable storage media having instructions stored thereupon for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, an input/output controller 816 may provide output to a display, such as a computer monitor, a flat-panel display, a digital projector, a printer, or other type of output device. It will be appreciated that the computer 800 might not include all of the components shown in FIG. 8, may include other components that are not explicitly shown in FIG. 8, or might utilize an architecture completely different than that shown in FIG. 8.

As described herein, the computer 800 may comprise one or more of the external computing device (not shown) and any network devices, the PCIe switch 106, the disk 108, the NIC 110, and/or other systems or devices associated with the computing device 100 and/or remote from the computing device 100. The computer 800 may include one or more hardware processor(s) such as the CPUs 804 configured to execute one or more stored instructions. The CPUs 804 may comprise one or more cores. Further, the computer 800 may include one or more network interfaces configured to provide communications between the computer 800 and other devices, such as the communications described herein as being performed by the external computing device (not shown) and any network devices, the PCIe switch 106, the disk 108, the NIC 110, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth. The programs 822 may comprise any type of programs or processes to perform the techniques described in this disclosure for the external computing device (not shown) and any network devices, the PCIe switch 106, the disk 108, the NIC 110, as described herein. The programs 822 may enable the devices described herein to perform various operations.

CONCLUSION

The examples described herein provide systems, methods, and non-transitory computer-readable medium that divides or splits the control plane and the data plane within a computing device or system to ensure that the data is not cached for a read or write operation. The present disclosure provides an efficient, web-centric, optimized data storage solution that enables data storage performance improvements and exposes data storage to application developers by taking advantage of web protocol (e.g., HTTP/3) for command and control as well as NIC offload protocols. The present systems, methods, and non-transitory computer-readable medium simplifies the data read and wrote operations and enables CPU bypass as required and when required. This results in significantly improved data storage performance in the context of improvements in IOPS, latency, CPU utilization, etc. whether the data storage is for BM, VM, CN, and FaaS environments.

Further, the present disclosure assists application developers with access storage via a familiar (e.g., HTTP/3) semantics which, in turn, makes data storage more application-centric. HTTP/3 and QUIC protocols allow easy interleave/deinterleave of control data and control messages may be sent to the CPU where processing and intelligence may be applied to the read and write operations. Data blocks pass directly between the disk and the NIC while removing the need for the CPU to handle data. Further, NIC offload provided by the present systems, methods, and non-transitory computer-readable medium may be used to handle segmentation/desegmentation of data blocks into QUIC/HTTP3 protocol-based messages and packets.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A non-transitory computer-readable medium storing instructions that, when executed, causes central processing unit (CPU) of a host computing device to perform operations, comprising:

computing a hypertext transmission protocol version 3 (HTTP/3) header of a first message received at a network interface controller (NIC) device into a non-volatile memory express (NVMe) message, the first message including a request associated with data of a data storage device;

determining, by the CPU and based on the request, a permission for a device associated with the CPU for the data;

transmitting the NVMe message to the device, the NVMe message including an indication of the permission; and with the NVMe message and based at least in part on the permission determined by the CPU, instructing the NIC to transmit the data directly between the NIC and the data storage device such that the CPU refrains from copying the data to a cache of the CPU.

2. The non-transitory computer-readable medium of claim 1, wherein the request is a read request, the operations further comprising:

copying the HTTP/3 header of the first message to the cache of the CPU;

generating a response header based on the HTTP/3 header;

transmitting the response header to the NIC; and instructing the NIC to:

include the response header in a response packet; and transmit the response packet to the device.

3. The non-transitory computer-readable medium of claim 1, wherein the request is a read request, the operations further comprising:

transmitting the NVMe message to the data storage device associated with the CPU; and instructing the data storage device to transmit data from the data storage device directly to the NIC via a switch based on the NVMe message.

4. The non-transitory computer-readable medium of claim 3, the operations further comprising:

instructing the NIC to:

segment the data into data segments;

generate data packets;

insert the data segments into the data packets; and transmit data packets to the device.

5. The non-transitory computer-readable medium of claim 3, the operations further comprising receiving an NVMe completion message from the data storage device at the CPU.

6. The non-transitory computer-readable medium of claim 1, wherein the request is a write request, the operations further comprising:

copying the HTTP/3 header of the first message to the cache of the CPU;

computing the HTTP/3 header of the first message into a control message; and transmitting the control message to the NIC.

7. The non-transitory computer-readable medium of claim 6, the operations further comprising:

causing data packets to be received at the NIC data packets comprising data segments; and coalescing the data segments into a data block.

8. The non-transitory computer-readable medium of claim 7, the operations further comprising:

computing the NVMe message based at least in part on the control message;

transmitting the NVMe message to a data storage device; and causing the data block to be transmitted from the NIC directly to the data storage device via a switch based on the NVMe message.

9. A method of managing data storage processes, comprising:

at a central processing unit (CPU) of a host computing device, computing a hypertext transmission protocol version 3 (HTTP/3) header of a first message received at a network interface controller (NIC) device into a non-volatile memory express (NVMe) message, the first message including a request associated with data of a data storage device;

determining, by the CPU and based on the request, a permission for a device associated with the CPU for the data;

transmitting the NVMe message to the device, the NVMe message including an indication of the permission; and with the NVMe message and based at least in part on the permission determined by the CPU, instructing the NIC to transmit data directly between a NIC and the data storage device such that the CPU refrains from copying the data to a cache of the CPU.

10. The method of claim 9, wherein the request is a read request, the method further comprising:

copying the HTTP/3 header of the first message to the cache of associated with the CPU;

generating a response header based on the HTTP/3 header;

transmitting the response header to the NIC; and instructing the NIC to:

include the response header in a response packet; and transmit the response packet to the device.

11. The method of claim 9, wherein the request is a read request, the method further comprising:

transmitting the NVMe message to a data storage device associated with the CPU; and instructing the data storage device to transmit data from the data storage device directly to the NIC via a switch based on the NVMe message.

12. The method of claim 11, further comprising:

instructing the NIC to:

segment the data into data segments;

generate data packets;

insert the data segments into the data packets; and transmit the data packets to the device.

13. The method of claim 11, further comprising receiving an NVMe completion message from the data storage device at the CPU.

14. The method of claim 9, wherein the request is a write request, the method further comprising:

copying the HTTP/3 header of the first message to the cache of the CPU;

computing the HTTP/3 header of the first message into a control message; and transmitting the control message to the NIC.

15. The method of claim 14, further comprising:

Causing data packets to be received receiving at the NIC, the data packets comprising data segments; and coalescing the data segments into a data block.

16. The method of claim 15, further comprising:

computing the NVMe message based at least in part on the control message;

transmitting the NVMe message to the data storage device; and causing the data block to be transmitted from the NIC directly to the data storage device via a switch based on the NVMe message.

17. A system comprising:

a central processing unit (CPU) of a host computing device; and a non-transitory computer-readable media storing instructions that, when executed by the CPU, causes the CPU to perform operations comprising:

computing a hypertext transmission protocol version 3 (HTTP/3) header of a first message received at a network interface controller (NIC) device into a non-volatile memory express (NVMe) message, the first message including a request associated with data of a data storage device;

determining, by the CPU and based on the request, a permission for a device associated with the CPU for the data;

transmitting the NVMe message to the device, the NVMe message including an indication of the permission; and with the NVMe message and based at least in part on the permission determined by the CPU, instructing the NIC to transmit the data directly between the NIC and the data storage device such that the CPU refrains from copying the data to a cache of the CPU.

18. The system of claim 17, wherein the request is a read request, the operations further comprising:

copying the HTTP/3 header of the first message to the cache of the CPU;

generating a response header based on the HTTP/3 header; and transmitting the response header to the NIC; and instructing the NIC to:

include the response header in a response packet; and transmit the response packet to the device;

transmitting the NVMe message to the data storage device associated with the CPU;

instructing the data storage device to transmit data from the data storage device directly to the NIC via a switch based on the NVMe message;

instructing the NIC to:

segment the data into data segments;

generate data packets;

insert the data segments into the data packets; and transmit the data packets to the device; and receiving an NVMe completion message from the data storage device at the CPU.

19. The system of claim 17, wherein the request is a write request, the operations further comprising:

copying the HTTP/3 header of the first message to the cache of the CPU;

computing the HTTP/3 header of the first message into a control message;

transmitting the control message to the NIC;

causing data packets to be received at the NIC, the data packets comprising data segments;

coalescing the data segments into a data block;

computing the NVMe message based at least in part on the control message;

transmitting the NVMe message to the data storage device; and causing the data block to be transmitted from the NIC directly to the data storage device via a switch based on the NVMe message.

20. The system of claim 17, wherein the first message comprises:

a QUIC header;

a type value;

a length; and an HTTP header.

* * * * *